(12) United States Patent
Meloche

(10) Patent No.: US 8,761,179 B2
(45) Date of Patent: *Jun. 24, 2014

(54) SYSTEM AND METHOD FOR DETECTING SOURCES OF ROGUE NON-AUDIO TRAFFIC MARKED AS AUDIO TRAFFIC

(71) Applicant: Avaya Inc., Basking Ridge, NJ (US)

(72) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/668,412

(22) Filed: Nov. 5, 2012

(65) Prior Publication Data

US 2013/0058243 A1 Mar. 7, 2013

Related U.S. Application Data

(63) Continuation of application No. 12/827,628, filed on Jun. 30, 2010, now Pat. No. 8,306,029.

(60) Provisional application No. 61/309,192, filed on Mar. 1, 2010, provisional application No. 61/312,497, filed on Mar. 10, 2010.

(51) Int. Cl.
*H04L 12/28* (2006.01)

(52) U.S. Cl.
USPC .......................................................... 370/392

(58) Field of Classification Search
None
See application file for complete search history.

(56) References Cited

U.S. PATENT DOCUMENTS

| 7,835,293 | B2 | 11/2010 | Cidon et al. | |
| 8,306,029 | B2 * | 11/2012 | Meloche | 370/392 |
| 8,462,634 | B2 * | 6/2013 | Meloche | 370/236 |

* cited by examiner

*Primary Examiner* — Duc C Ho

(57) ABSTRACT

Disclosed herein are systems, methods, and computer-readable storage media for managing a packet network to deal with rogue applications that produce non-audio packets marked as audio packets. The system analyzes packet flow through the network to identify an unauthorized source of non-audio packets marked as audio packets, and upon identifying the unauthorized source, the system stops subsequent unauthorized transmission of non-audio packets marked as audio packets from the identified unauthorized source. For example, such an unauthorized source is identified by finding that an audio marked packet has a source address that is not found on a list of authorized sources, or by detecting atypical patterns of audio queue utilization, or by determining whether audio marked packets from a source exceed a threshold value related to transmission of audio marked packets.

17 Claims, 7 Drawing Sheets

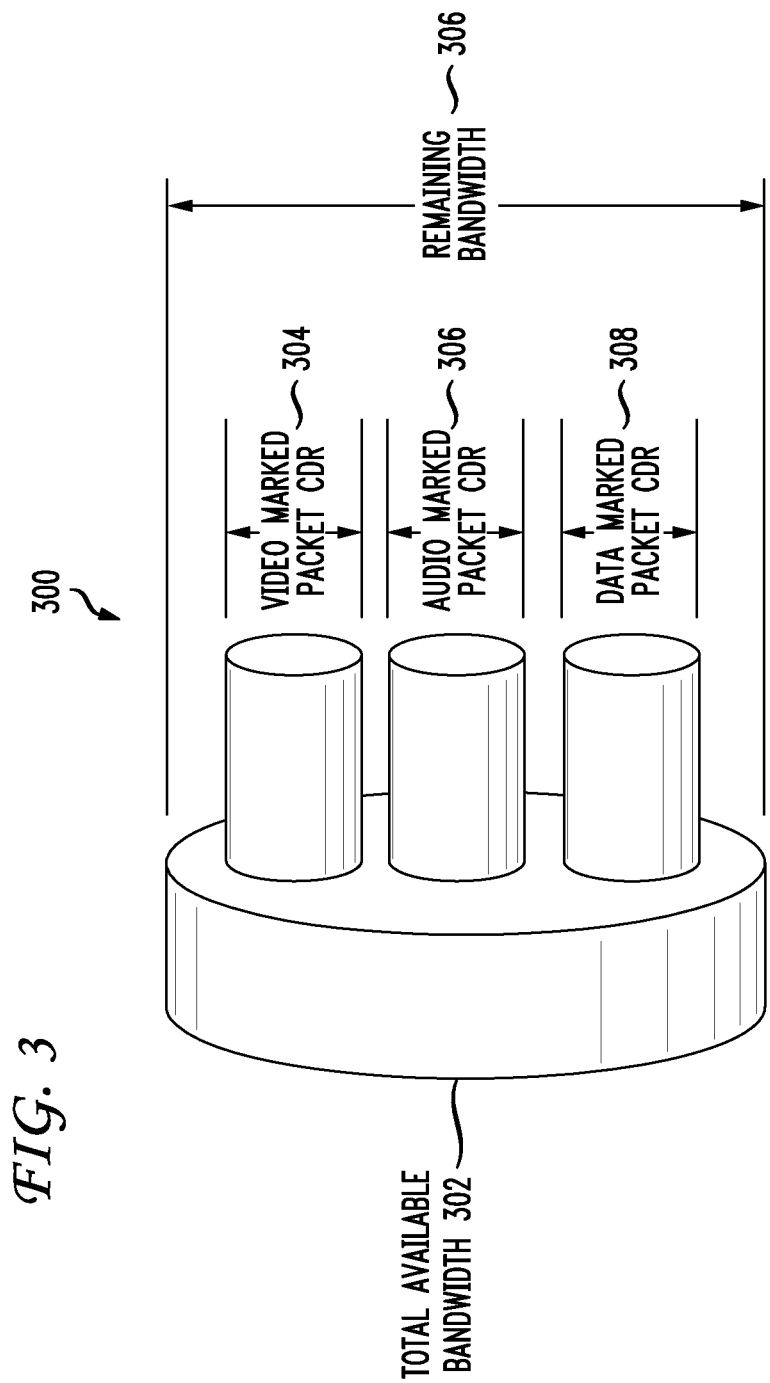

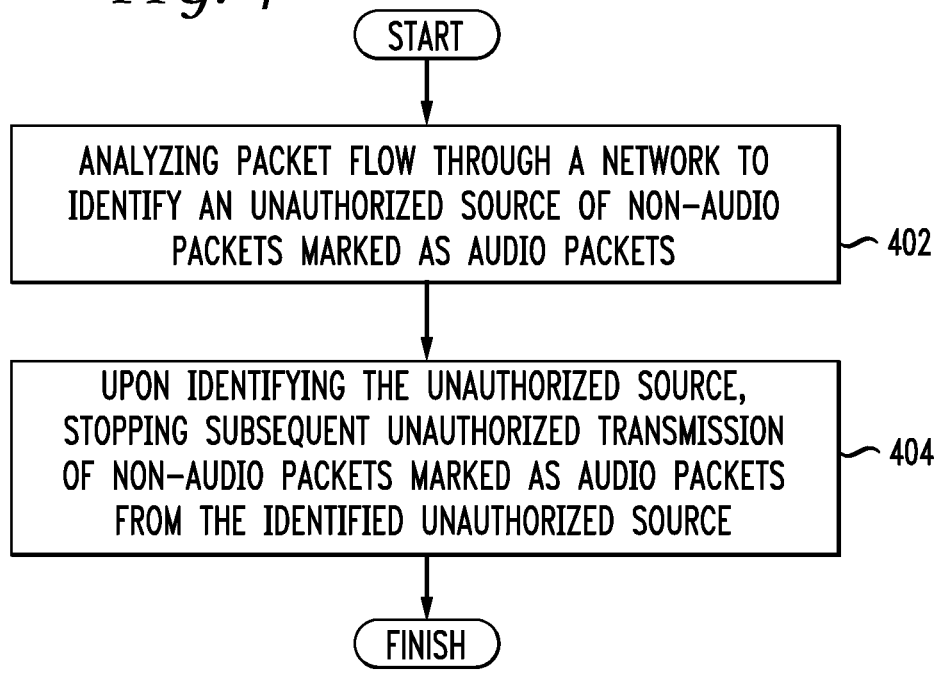
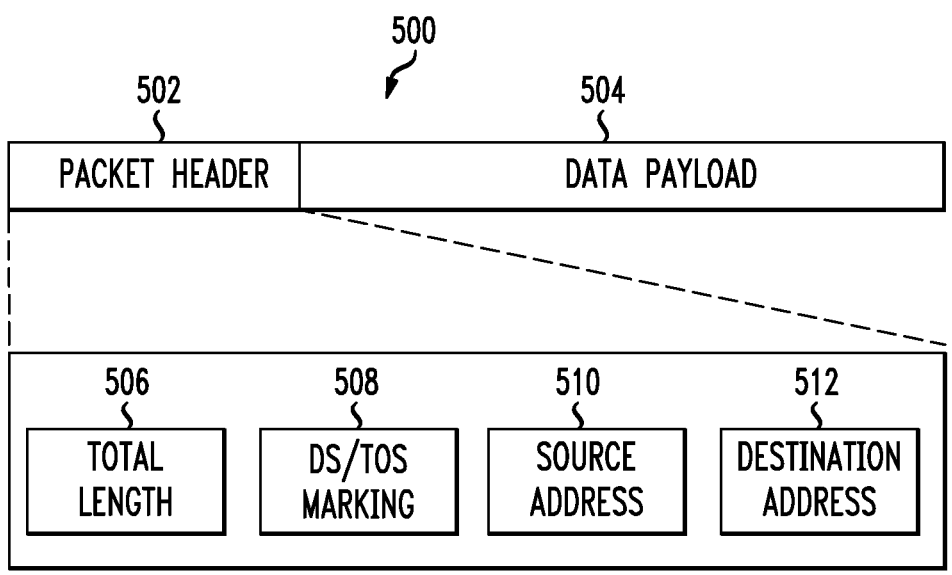

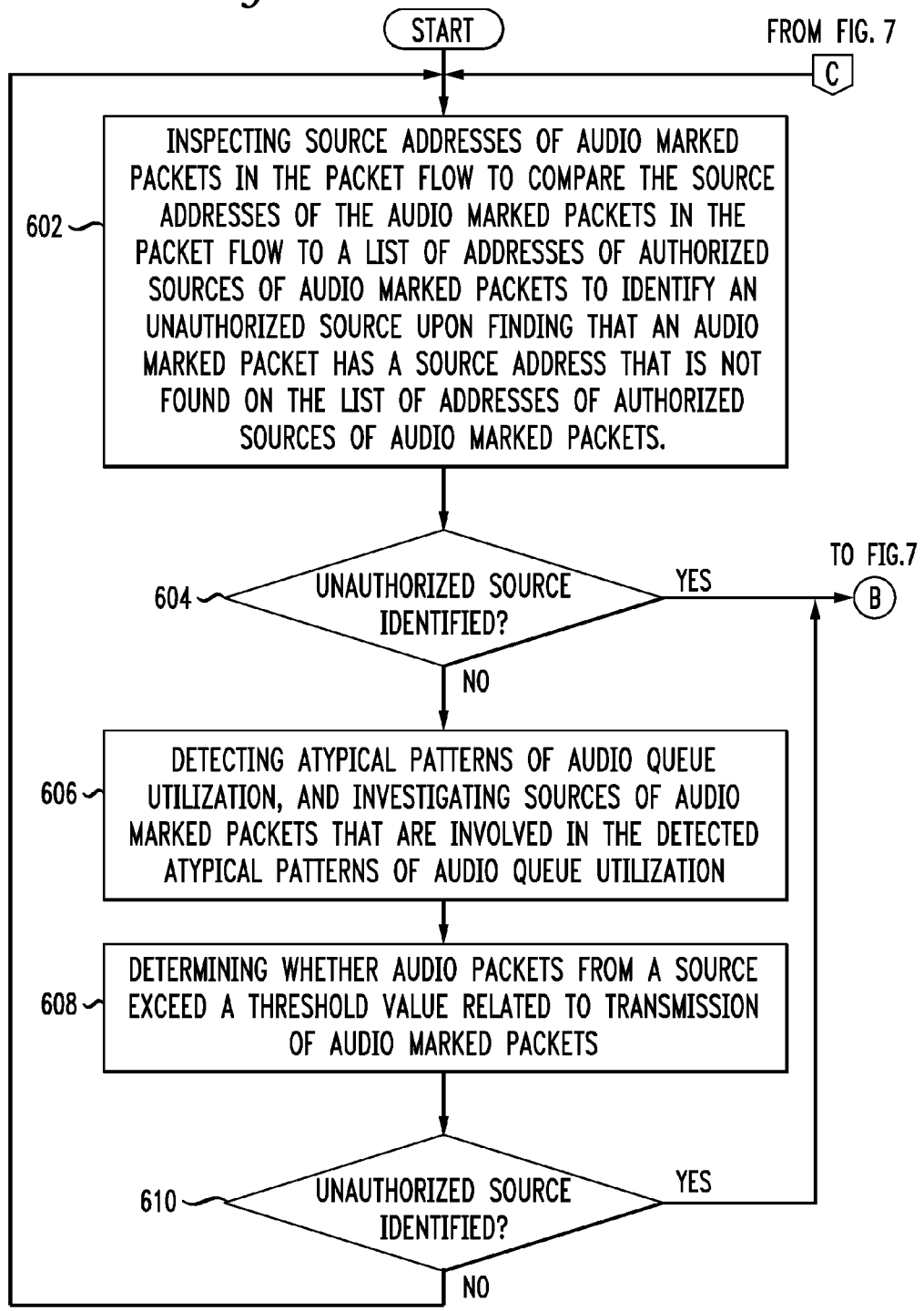

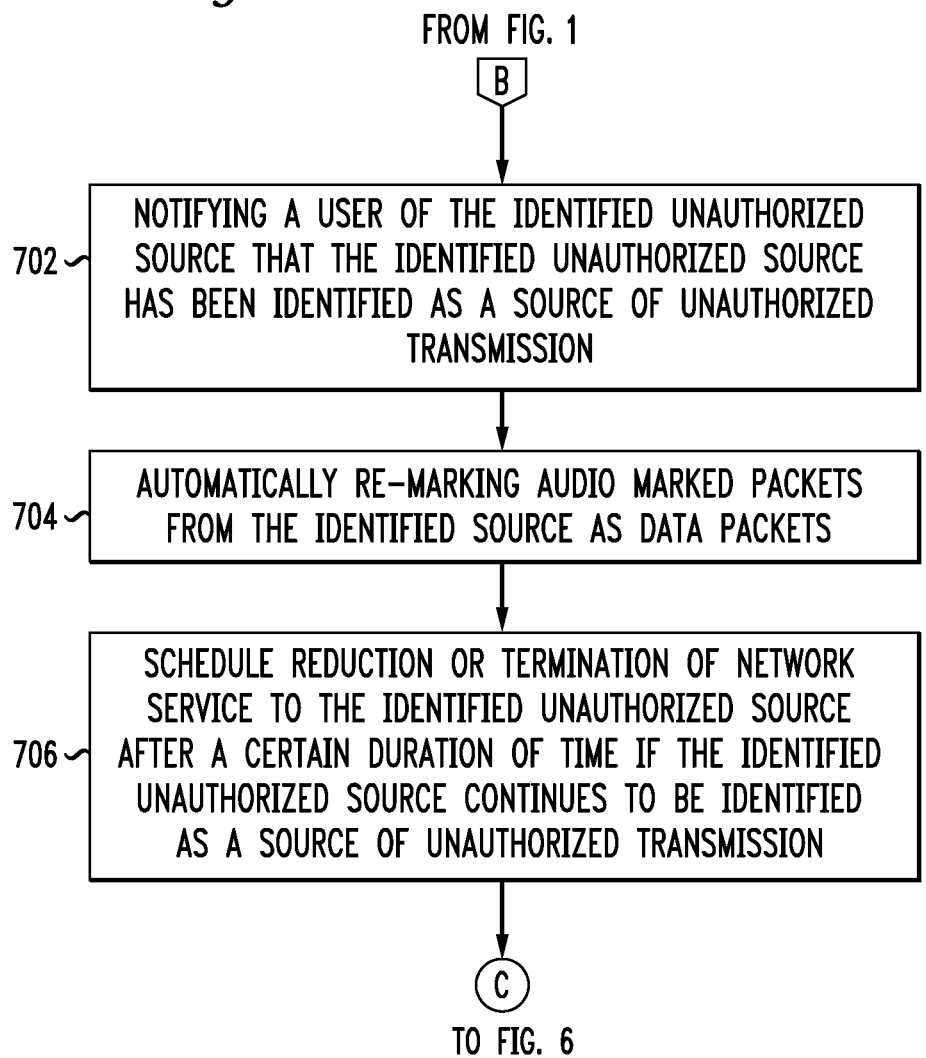

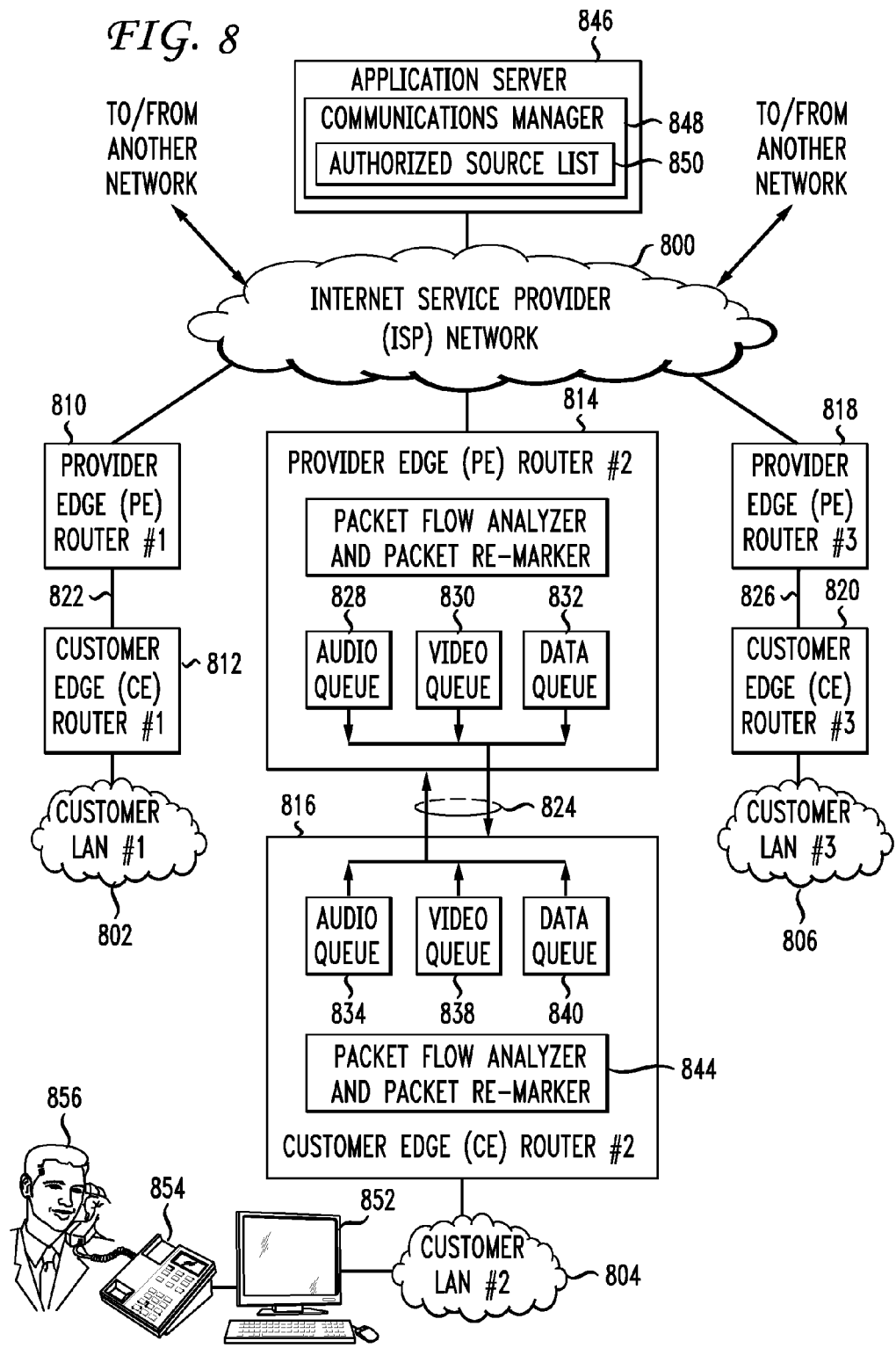

SYSTEM AND METHOD FOR DETECTING SOURCES OF ROGUE NON-AUDIO TRAFFIC MARKED AS AUDIO TRAFFIC

RELATED APPLICATIONS

This application is a continuation of U.S. patent Ser. No. 12/827,628, filed Jun. 30, 2010, which claims the benefit of U.S. Provisional Application No. 61/309,192, filed Mar. 1, 2010, and the benefit of U.S. Provisional Application No. 61/312,498, filed Mar. 10, 2010, each of which is incorporated herein by reference in its entirety.

BACKGROUND

1. Technical Field

The present disclosure relates to network management and more specifically to detecting network traffic sources that intentionally or unintentionally transmit packets of non-audio data marked as audio data.

2. Introduction

In packet networks, packets can be marked for processing. Such markings can identify a packet as an audio packet, video packet, or data packet. Typically network infrastructure grants an audio packet the highest priority, followed by video packets and then data packets. A problem arises in which network devices either intentionally miss-mark non-audio packets as audio packets for higher priority or network devices are mistakenly plugged in to the wrong part of the network which causes non-audio packets to be marked as audio packets. These incorrect markings lead to such miss-marked traffic receiving more preferential treatment than is justified. These are two examples of sources of "rogue traffic", i.e. network packets of one type that are marked as another type. In either case, sources of rogue traffic use bandwidth of which the system is unaware. The system continues to allocate or allow bandwidth within a committed data rate (CDR) or queue to be used even though it is already used by rogue traffic. Thus, packets are dropped even when the network devices think sufficient bandwidth is available in a particular CDR or queue.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for managing a packet network. A system configured to practice the method analyzes packet flow through the network to identify an unauthorized source of non-audio packets marked as audio packets, and upon identifying the unauthorized source, stops subsequent unauthorized transmission of non-audio packets marked as audio packets from the identified unauthorized source.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an example committed data rate in a network;

FIG. 4 illustrates an example method embodiment;

FIG. 5 shows a packet used in the network of FIG. 2;

FIGS. 6 and 7 together illustrate a flowchart of a specific implementation of the method of FIG. 4; and FIG. 8 illustrates a specific implementation of the method of FIG. 4 in a network embodiment.

DETAILED DESCRIPTION

Figure 1:
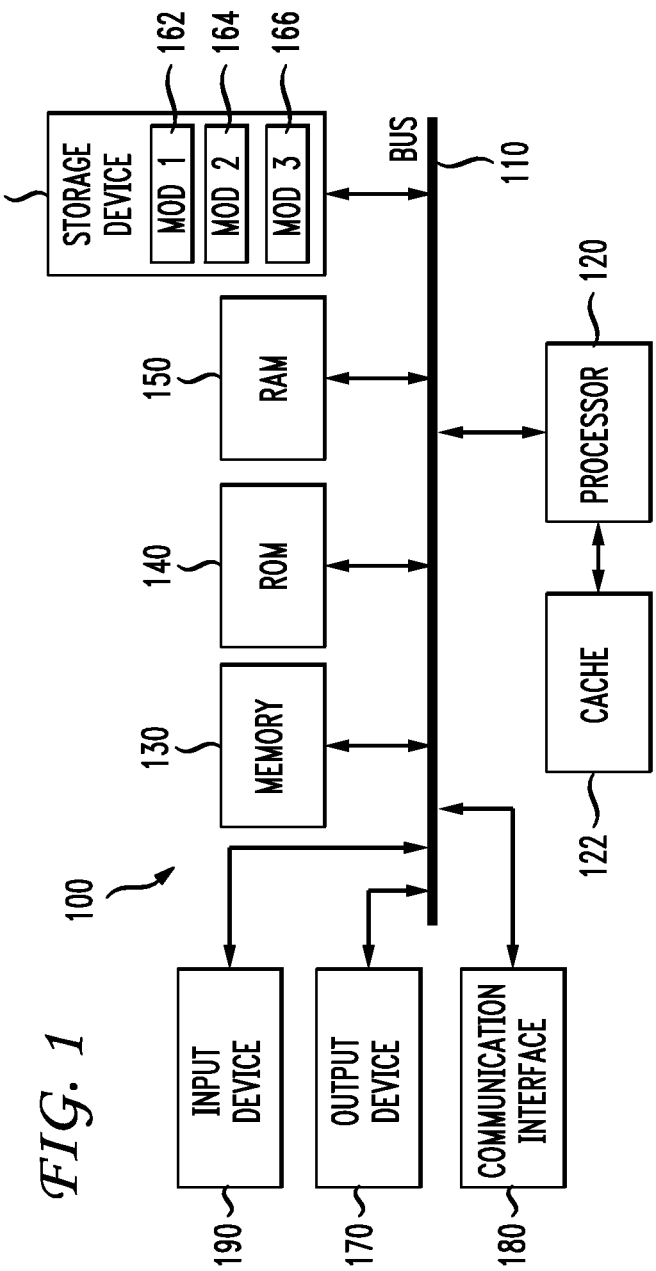
FIG. 1 illustrates an example system embodiment.

The present disclosure addresses the need in the art for improved network management approaches for handling "rogue" audio packets. A brief discussion of foundational principles and examples are provided first, followed by a discussion of a basic general purpose system or computing device in FIG. 1 and an example network configuration which can be employed to practice the concepts disclosed herein. A more detailed description of methods and system will then follow.

When an enterprise gets a circuit from an internet service provider (ISP), the enterprise can carve up the circuit into sections reserved for audio, video, and data, for example. The number of sections can be one or more, but one common configuration is at least three sections. The size of the data rate, or bandwidth, of each respective section is called a committed data rate (CDR). The sections are referred to as classes of service (COS). For some ISPs, COS 1 is a strict priority section and is usually used for audio traffic, although the enterprise can change this configuration. For example, an enterprise can put video traffic in COS 1.

The enterprise indicates the class of service that is intended for each packet by marking each packet with a differentiated service code point (DSCP) marking that can be located in the packet header, for example. One commonly used value, 46, indicates that a packet belongs to COS 1. The actual value used is arbitrary. The enterprise should indicate to the ISP how the DSCP values map to the various COSs to obtain benefits from this approach.

The ISP implements the desired priority on customer edge (CE) network hardware such as routers for outgoing traffic and on provider edge (PE) network hardware such as routers for incoming traffic. The routers are typically located in the boundary between a high speed network (i.e. the enterprise local area network or LAN) and a more limited capacity link (the ISP's network). Thus, a packet sent from one enterprise location to another would traverse the network in this sequence: first enterprise LAN, first enterprise CE, ISP PE for the first enterprise, ISP cloud, PE for the second enterprise, second enterprise CE, second enterprise LAN.

The limited capacity links are between the CE and PE pairs. Because the first enterprise LAN is high speed compared to the CE/PE outgoing link, the CE must prioritize how it sends traffic and what traffic to send to the PE. The CE prioritizes traffic by forming queues for each COS. The CE inserts incoming packets into each queue based on the packet markings and transmits packets to the PE according to priorities that result in different levels of end-to-end performance for each COS. Essentially the same approach applies at the second enterprise because the ISP cloud is high speed compared to the PE/CE incoming link except that the PE prioritizes the traffic sent to the CE.

COS 1 is special because it confers strict priority to COS 1 marked packets. The ISP router that prioritizes enterprise traffic gives COS 1 packets a strict priority in that it will not transmit packets marked as non COS 1 unless the COS 1 queue is empty. Such preferential treatment is given to all COS 1 packets provided that the amount of COS 1 traffic does not exceed the COS 1 CDR. If COS 1 traffic exceeds the COS 1 CDR, the routers may simply drop the excess COS 1 traffic.

The other queues are treated jointly, but the router drains each of the remaining queues at a speed that is proportional to their respective CDR. For example, if the router has a COS 2 queue with CDR 20 and a COS 3 queue with CDR 10, the router will transmit twice as much traffic from the COS 2 queue than from the COS 3 queue, draining the COS 2 queue twice as fast as the COS 3 queue. This is how video packets in the COS 2 queue can get better treatment than data packets in the COS 3 queue, for example.

The queues other than COS 1 are also limited by their respective CDRs in a similar manner to the COS 1 queue, but the effect of their CDR is different than for the COS 1 queue. When the router receives too much traffic for a COS, it designates the excess traffic as "out of contract". Such "out of contract" packets are not necessarily dropped, but the service level agreement (SLA) contract with the ISP does not apply to them. Once a packet has been designated as in or out of contract, it is subject to a certain probability of being dropped depending on the designation and on how full the corresponding queue is.

Out of contract packets are simply more likely to get dropped than in contract packets. If the amount of incoming traffic approaches circuit capacity, at least a portion of the out of contract packets is very likely to be dropped.

Because of the priority associated with COS 1, the router does not hold COS 1 packets in a long backlog in a queue. The router basically transmits a COS 1 packet as soon as it arrives with a delay that consists of whatever the router hardware had already committed to transmit at the time the COS 1 packet arrived, which is typically a very insignificant delay. This leads to extremely low levels of jitter for packets in COS 1 because they are handled as they arrive. Jitter is an audio effect particularly noticeable in real-time audio applications such as voice over IP (VoIP) due to out-of-order arrival or high variability in transmission latency of audio packets.

As a result, in the scenarios outlined above, it is perfectly plausible to have packet loss in COS 1, but no packet loss in COS 2 and/or COS 3. This can indicate that the COS 1 CDR has been exceeded. It is also possible to have massive loss in COS 2 and/or COS 3 with no or minimal loss in COS 1. This can indicate that the amount of traffic received exceeds the circuit capacity but that the amount of COS 1 traffic is less than the COS 1 CDR. It is possible to have very little jitter in COS 1 and substantial jitter in COS 2 and/or COS 3. This can indicate heavy COS 2 and/or COS 3 traffic. Thus, even when there is loss in COS 1, the packets that do make it through experience very little jitter. Various embodiments based on an understanding of these principles shall be discussed herein. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics.

It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules (Mod1 162, Mod2 164 and Mod3 166), which are modules configured to control the processor 120. These modules may be stored on the storage device 160 and loaded into RAM 150 or memory 130 at runtime or may be stored as would be known in the art in other computer-readable memory locations.

Figure 2:
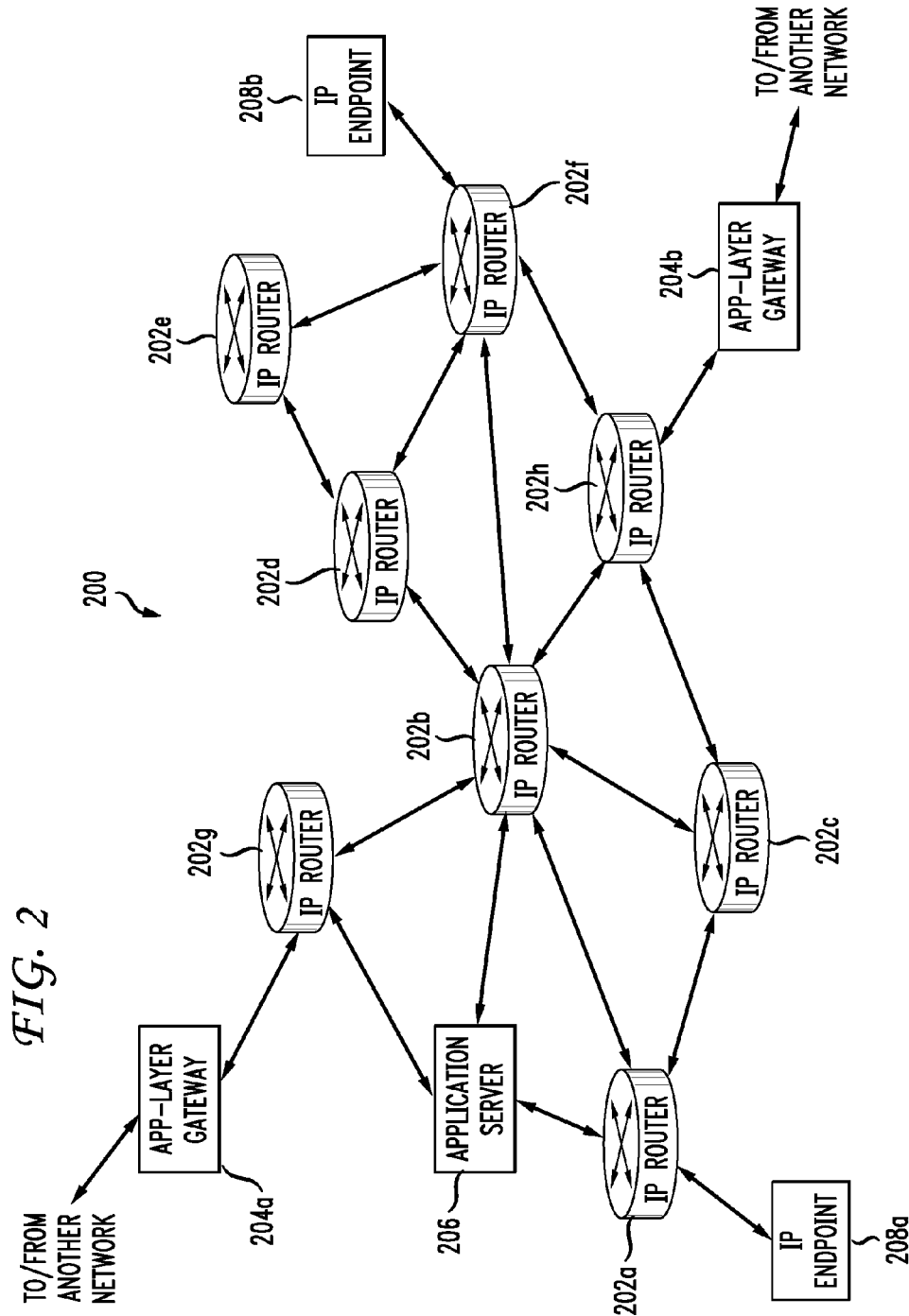
FIG. 2 illustrates an example network embodiment.

FIG. 2 illustrates an example telecommunications network embodiment 200. As shown in FIG. 2, telecommunications network 200 comprises application-layer gateways 204a, 204b, an application server 206, Internet Protocol (IP) endpoints 208a, 208b, and various interconnected IP routers 202a-202h. This particular configuration of an IP-based network is illustrative. The telecommunications network is not limited to an IP-based network and is not limited to this particular configuration of application-layer gateways 204a, 204b, IP routers 202a-202h, etc.

Each IP router 202a-202h is a device that receives IP packets via one or more incoming network links and forwards the received packets along one or more outgoing network links. Typically IP routers 202a-202h maintain dynamic routing tables that enable the routers to alter the paths by which traffic is transmitted through the network 200. IP routers 202a-202h can reroute network traffic along different paths through the network 200 over time in response to various conditions such as link failures, congested routes, toll charges, and so forth. A data source such as an IP endpoint 208a, 208b or a network transmission mechanism such as an IP router 202a-202h can mark certain packets according to their contents. For example, audio traffic is marked as audio packets, video traffic is marked as video packets, and data traffic is marked as data packets.

Application-layer gateways 204a, 240b are data-processing systems that are capable of providing one or more application-layer functions such as Voice over IP (VoIP), FTP, streaming video, Internet Protocol Television (IPTV), remote desktop services, and so forth. Moreover, application-layer gateways 204a, 240b are also capable of participating in the performing of one or more of the tasks described below and with respect to FIGS. 4-8.

Application server 206 is a data-processing system that provides one or more services to support a particular application such as VoIP or IPTV, and is also capable of participating in the performing of one or more of the tasks described below and with respect to FIGS. 4-8. In accordance with one illustrative embodiment, application server 206 provides VoIP services such as call setup between two or more Internet Protocol endpoints 208a, 208b, call modification, call termination, etc. The application server 206 can provide services for other applications as well, including videoconferencing, IPTV, instead of or in addition to VoIP.

Each IP endpoint 208a, 208b is a device such as an IP telephone, an IP headset, an IP handset, an IP softphone, or an IP conference phone that communicates with other devices over the network 200 in accordance with the Internet Protocol (IP). Moreover, IP endpoints 208a, 208b can also perform one or more of the tasks described below.

The disclosure now returns to a discussion of management of a packet network to deal with the problem of rogue audio packets. The rogue audio packets interfere with management of the audio (COS 1) CDR. Typically a Communications Manager (CM) is responsible for management of the available audio bandwidth (306 in FIG. 3). For this purpose, the CM is aware at all time of the number of audio sessions that are established and of the COS 1 CDR. When a call is attempted that would commit an amount of traffic that exceeds the COS 1 CDR, the call is denied with a message that all circuits are busy. This process is called the Call Admission Control (CAC) process.

A rogue application is an application that consumes the audio bandwidth without the knowledge of CM. The presence of rogue applications interfere with the CAC process by causing the CM to admit calls beyond the COS 1 CDR limit. Therefore it is desired to provide a way of identifying rogue applications to stop subsequent transmission of rogue audio packets from the rogue applications.

FIG. 4 illustrates a first exemplary method embodiment for managing a packet network. The system (100 in FIG. 1) analyzes packet flow through the network to identify an unauthorized source of non-audio packets marked as audio packets (step 402). Then the system stops subsequent unauthorized transmission of non-audio packets marked as audio packets from the identified unauthorized source (step 404).

The analysis of the packet flow in step 402 may use commercial software tools such as "sflow" or "netflow" that can be configured to decode and transmit relevant IP header information from packets received on a router interface. For example, FIG. 5 shows a typical packet 500 including a packet header 502 and data payload 504. The flow of audio packets to the audio queue in a customer edge (CE) router or a provider edge (PE) router is monitored by "sflow" or "netflow" to obtain the size of each packet (i.e., the total length) 506, differentiated services (DS) or type of service (TOS) marking 508, source address 510, and destination addresses 512. The DS or TOS marking 508 indicates whether or not the packet 500 is marked as an audio packet. This packet header information is further analyzed to identify rogue packets from a specific source, and then the source address 510 in these rogue packets identifies the rogue application from which the rogue packets originated.

There are several ways of analyzing the packet header information to identify rogue packets from a specific source. A first way is to check the source and destination addresses of packets marked as audio against a list of authorized audio producers and consumers. Such a list is available from the Communications Manager (CM).

A second way of analyzing the packet header information to identify rogue packets from a specific source is to detect atypical patterns of audio queue utilization. For example, a typical pattern of audio queue utilization is for the amount of audio traffic into a site to be roughly equal to the amount of audio traffic out of the site. Any substantial difference in the audio traffic in the two directions usually indicates that a rogue application is causing the excessive audio traffic in or out of the site.

A third way of analyzing the packet header information to identify rogue packets from a specific source is to determine whether audio marked packets received from a source exceed a threshold value related to transmission of the audio marked packets. Audio streams are normally set up by signaling for a period of time and then terminated by the communications manager (CM) using various forms of signaling to the devices involved. This dismantling of the media channel can fail and results on a sort of leak as the communications manager (CM) thinks that the bandwidth is available while the device keeps on consuming the bandwidth. Measuring the length of time during which a source or destination address is involved in a stream of audio packets can reveal the presence of such a leak. For example, few VoIP calls would last several days. Therefore, a source of a stream of audio marked packets lasting longer than a threshold duration of time indicates that the source is likely to be a rogue source.

For each of these three ways of analyzing the packet header information, the amount of bandwidth consumed by each rogue application can be tracked and used to prioritize further investigation and shut-down of the rogue applications.

The second and third ways of analyzing the packet header information are "agnostic' in the sense that they do not involve the communications manager (CM), but they are more likely to involve false positives than the first way. Therefore rogue applications detected by the second and third ways warrant further investigation. For example, audio transmission from rogue applications detected by the second and third ways could be shut down more gracefully than rogue applications detected by the first way. Moreover, the second and third ways of analyzing the packet header information can be performed concurrently so that a strong indication of a rogue application would result if each of the second and third ways of analyzing the packet header information identifies the same source as a rogue application.

The stopping of subsequent unauthorized transmission in step 404 can be performed in various ways. For example, the system notifies a user of the identified source that the identified source has been identified as a source of rogue audio packets. The system 100 also can automatically re-mark audio-marked packets from the identified source as data packets, or restrict transmission bandwidth of the identified source, or cut off all transmission from the identified source. Subsequent unauthorized transmission can be stopped abruptly or gracefully, depending on the amount of unauthorized transmission detected from the identified source, depending on degree of confidence indicated by the way in which the source was identified, and depending on any customer agreement or business relationship between the user of the identified source and the packet network provider or ISP.

For example, unauthorized transmission from a preferred customer could be stopped gracefully by first sending a notification to the source device and to any administrator responsible for the source device, and later automatically re-marking audio-marked packets, and if the unauthorized transmission continues, by progressively restricting transmission bandwidth until all transmission from the customer is cut off.

In one variation, the system sends a notice of conditional allowance to send miss-marked packets to the offending device, but as soon as bandwidth gets tight in that queue or CDR, at least one element of the network will re-mark packets from the offending device as data or voice instead of audio, for example. The notice of conditional allowance or a notice of impending reduction or termination of service can be sent by a network node integrated as part of the network that re-marks packets, a network monitoring module not integrated with the network, or any other suitable device or configuration.

Previous approaches such as reducing the Call Admission Control (CAC) limit and increasing the CDR are palliative measures that don't solve the cause of the problem and can only reduce symptoms in a limited way. These previous approaches simply reduce the relative importance of the problem at a substantial cost. The method of this disclosure provides an improvement over the prior approaches because it provides for direct examination of the sources of marked packets and patterns of usage to determine if a particular packet source is generating rogue traffic.

The method of this disclosure can be used to detect intentional and/or unintentional sources of rogue network traffic miss-marked as audio packets, thereby preserving the high priority bandwidth for actual audio packets and leading to an overall improvement of audio transmission quality within the network. Further, in the case of excessive amounts of data miss-marked as audio packets, the method of this disclosure can resolve the problem of exceeding the audio packet committed data rate (CDR) which may lead to the purchase of unnecessary additional bandwidth.

FIGS. 6 and 7 show a flowchart of a specific implementation of the method of FIG. 4. The operations in FIG. 6 perform the first step (402) in FIG. 4, and the operations in FIG. 7 perform the second step (404) in FIG. 4.

A first step 602 in FIG. 6 includes inspecting source addresses of audio marked packets in the packet flow to compare the source addresses of the audio marked packets in the packet flow to a list of addresses of authorized sources of audio marked packets to identify an unauthorized source upon finding that an audio marked packet has a source address that is not found on the list of addresses of authorized sources of audio marked packets. Next, in step 604, if an unauthorized source was not identified (in the previous step 602), then the method continues from step 604 to step 606

Step 606 includes detecting atypical patterns of audio queue utilization, and investigating sources of audio marked packets that are involved in the detected atypical patterns of audio queue utilization. A following step 608 includes determining whether audio packets from a source exceed a threshold value related to transmission of audio marked packets. Then in step 610, if an unauthorized source was not identified (in the previous step 606 or in step 608), then the method loops from step 610 back to step 602 to continue the analysis of the packet flow to identify an unauthorized source of non-audio packets marked as audio packets.

In step 604, if an unauthorized source was identified (in the previous step 602), then the method continues from step 604 to step 702 in FIG. 7. The method also continues to step 702 from step 610 if an unauthorized source was identified in step 606 or in step 608.

In FIG. 7, step 702 includes notifying a user of the identified unauthorized source that the identified unauthorized source has been identified as a source of unauthorized transmission. Then step 704 includes automatically re-marking audio marked packets from the identified source as data packets. Finally, step 806, a reduction or termination of network service to the identified unauthorized source is scheduled to occur after a certain duration of time if the identified unauthorized source continues to be identified as a source of unauthorized transmission. The method loops from step 706 back to step 602 of FIG. 6 to continue the analysis of the packet flow to identify another unauthorized source of non-audio packets marked as audio packets.

FIG. 8 shows a network embodiment configured for implementing the method of FIGS. 6 and 7. In FIG. 8, an Internet Service Provider (ISP) network 800 provides service to at least three customers. The ISP network 800 is similar to the network 200 shown in FIG. 2. The network in FIG. 8 further includes a customer local area network (LAN) for each customer, and a customer edge (CE) router and a provider edge (PE) router for each customer. Each customer LAN includes customer endpoint equipment, such as VoIP phones or computer terminals. For example, FIG. 8 shows a first customer LAN 802, a second customer LAN 804, and a third customer LAN 806. A first provider edge (PE) router 810 and a first customer edge (CE) router 812 connect the ISP network 800 to the first customer LAN 802. A second provider edge (PE) router 814 and a second customer edge (CE) router 816 connect the ISP network 800 to the second customer LAN 804. A third provider edge (PE) router 818 and a third customer edge (CE) router 820 connect the ISP 800 to the third customer LAN 806.

In the network of FIG. 8, the second customer LAN 804 is linked to a personal computer 852 and a VoIP phone 854 operated by a human user 856. In this example, the personal computer 852 has a rogue application that sends and receives data packets marked as audio packets so that the data packets are transmitted from or received at an IP address of the VoIP phone 854 on the customer LAN 804.

Each provider edge (PE) router is connected by a limited capacity link to its respective customer edge (CE) router. A first limited capacity link 822 connects the first provider edge (PE) router 810 to the first customer edge (CE) router 812. A second limited capacity link 824 connects the second provider edge (PE) router 814 to the second customer edge (CE) router 816. A third limited capacity link 826 connects the third provider edge (PE) router 818 to the third customer edge (CE) router 820.

Each provider edge (PE) router includes an audio queue, a video queue, and a data queue for queuing audio, video, or data packets, respectively, which are transmitted over its limited capacity link to its respective customer edge (CE) router. For example, the second provider edge (PE) router 814 includes an audio queue 828, a video queue 830, and a data queue 832. Each customer edge (CE) router includes an audio queue, a video queue, and a data queue for queuing audio, video, or data packets, respectively, which are transmitted over its limited capacity link to its respective provider edge (PE) router. For example, the second provider edge (PE) router 814 includes an audio queue 834, a video queue 838, and a data queue 840.

In the example of FIG. 8, each provider edge (PE) router includes a respective packet flow analyzer and packet re-marker for performing the method of FIGS. 6 and 7 upon a flow of audio marked packets received from the ISP network 800 and addressed to destinations in the customer LAN serviced by its respective customer edge (CE) router. For example, the provider edge (PE) router 814 includes a packet flow analyzer and packet re-marker 842. If the provider edge (PE) router 814 receives an audio-marked packet from the ISP network 800 and the packet flow analyzer and packet re-marker 842 finds that the source address in the packet is an address of a source that has been identified as a rogue source, then the packet flow analyzer and packet re-marker 842 will re-mark the packet as a data packet or otherwise stop unauthorized transmission of the packet from the audio queue 828. For example, the packet flow analyzer and packet re-marker 842 re-marks the packet and puts the re-marked packet in the data queue 832 for transmission over the limited bandwidth link 824 to the customer edge (CE) router 816.

Each customer edge (CE) router also includes a respective packet flow analyzer and packet re-marker for performing the method of FIGS. 6 and 7 upon a flow of audio marked packets received from the respective customer LAN serviced by the customer edge (CE) router for transmission to the ISP network 800. For example, the customer edge (CE) router 816 includes a packet flow analyzer and packet re-marker 844. If the customer edge (CE) router 816 receives an audio marked packet from the customer LAN 804 and the packet flow analyzer and packet re-marker 844 finds that the source address in the packet is an address of a source that has been identified as a rogue source, then the packet flow analyzer and packet re-marker 844 will re-mark the packet as a data packet or otherwise stop unauthorized transmission of the packet from the audio queue 834. For example, the packet flow analyzer and packet re-marker 844 re-marks the packet and puts the re-marked packet in the data queue 840 for transmission over the limited capacity link 824 to the provider edge (CE) router 814.

At least the packet flow analyzers in the customer edge (CE) routers 812, 816, and 820 access an authorized source list 850 in a communications manager 848 in an application server 846 for the ISP network 800 in order to identify rogue sources. For example, if the packet flow analyzer and packet re-marker 844 finds that the an audio-marked packet from the personal computer 852 or VoIP phone 854 has a source address that is not on the authorized source list, then the packet flow analyzer and packet re-marker 844 puts the source address on a blacklist of identified rogue sources found on the customer LAN 804. The packet flow analyzer and packet re-marker 844 also sends a message to the user 856 notifying the user that the user's terminal equipment has a problem and the user should contact a representative of the ISP 800 to discuss the problem. The message, for example, is an automatic call to the VoIP phone 854 or an e-mail or instant message to the personal computer 852, The message is also sent to any systems administrator responsible for the customer LAN 804. The packet flow analyzer and packet re-marker 844 will then re-mark any audio-marked packets from the VoIP phone 854 or personal computer 852 as data packets so that packets from the VoIP phone 854 or personal computer 852 are placed in the data queue 840 instead of the audio queue 834 for transmission over the link 824 to the provider edge (PE) server 814.

The packet flow analyzers 842, 844 also analyze the packet flows for detecting atypical patters of audio queue utilization, and investigate sources of audio marked packets that are involved in detected atypical patterns of audio queue utilization. The packet flow analyzers 842, 844 also analyze the packet flows to determine whether audio marked packets from a source exceed a threshold value related to transmission of audio marked packets, as described above with reference to FIG. 6. If the flow analysis identifies an unauthorized source of non-audio packets marked as audio packets, then subsequent unauthorized transmission from the identified source is stopped as described above with reference to FIG. 7.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method comprising:
analyzing, via a processor, a packet flow through a packet network to identify an unauthorized source of non-audio packets marked as audio packets by:
comparing source addresses of a first group of audio-marked packets in the packet flow to a list of addresses of authorized sources of audio packets, wherein the unauthorized source is identified by finding an audio-marked packet in the packet flow having a source address that is not on the list; and
detecting atypical patterns of audio queue utilization and investigating sources of a second group of audio-marked packets involved in the atypical patterns; and
stopping a subsequent unauthorized transmission of a non-audio packet marked as an audio packet from the unauthorized source.

2. The method of claim 1, wherein investigating the sources of the second group of audio-marked packets comprises determining whether a third group of audio-marked packets from a source under investigation exceed a threshold value related to transmission of the third group of audio-marked packets.

3. The method of claim 1, wherein the unauthorized source is identified based on a number of audio-marked packets from the unauthorized source that exceeds a threshold value related to transmission of the audio-marked packets.

4. The method of claim 1, wherein stopping the subsequent unauthorized transmission comprises notifying a user of the unauthorized source that the unauthorized source has been identified as a source of unauthorized transmission.

5. The method of claim 1, wherein stopping the subsequent unauthorized transmission comprises re-marking audio-marked packets from the unauthorized source as data packets.

6. The method of claim 1, wherein stopping the subsequent unauthorized transmission comprises restricting transmission bandwidth for the unauthorized source.

7. A system comprising:
a processor; and
a computer-readable storage medium storing instructions which, when executed by the processor, cause the processor to perform operations comprising:
analyzing a packet flow through a packet network to identify an unauthorized source of non-audio packets marked as audio packets by:
comparing source addresses of a first group of audio-marked packets in the packet flow to a list of addresses of authorized sources of audio packets, wherein the unauthorized source is identified by finding an audio-marked packet in the packet flow having a source address that is not on the list; and
detecting atypical patterns of audio queue utilization and investigating sources of a second group of audio-marked packets involved in the atypical patterns; and stopping a subsequent unauthorized transmission of a non-audio packet marked as an audio packet from the unauthorized source.

8. The system of claim 7, wherein investigating the sources of the second group of audio-marked packets comprises determining whether a third group of audio-marked packets from a source under investigation exceed a threshold value related to transmission of the third group of audio-marked packets.

9. The system of claim 7, wherein the unauthorized source is identified based on a number of audio-marked packets from the unauthorized source that exceeds a threshold value related to transmission of the audio-marked packets.

10. The system of claim 7, wherein stopping the subsequent unauthorized transmission comprises notifying a user of the unauthorized source that the unauthorized source has been identified as a source of unauthorized transmission.

11. The system of claim 7, wherein stopping the subsequent unauthorized transmission comprises re-marking audio-marked packets from the unauthorized source as data packets.

12. The system of claim 7, wherein stopping the subsequent unauthorized transmission comprises restricting transmission bandwidth for the unauthorized source.

13. A computer-readable storage device storing instructions which, when executed by a processor, cause the processor to perform operations comprising:
analyzing, via a processor, a packet flow through a packet network to identify an unauthorized source of non-audio packets marked as audio packets by:
comparing source addresses of a first group of audio-marked packets in the packet flow to a list of addresses of authorized sources of audio marked packets, wherein the unauthorized source is identified by finding an audio marked audio-marked packet in the packet flow having a source address that is not on the list; and
detecting atypical patterns of audio queue utilization and investigating sources of a second group of audio-marked packets involved in the atypical patterns; and
stopping a subsequent unauthorized transmission of a non-audio packet marked as an audio packet from the unauthorized source.

14. The computer-readable storage device of claim 13, wherein investigating the sources of the second group of audio-marked packets comprises determining whether a third group of audio-marked packets from a source under investigation exceed a threshold value related to transmission of the third group of audio-marked packets.

15. The computer-readable storage device of claim 13, wherein the unauthorized source is identified based on a number of audio-marked packets from the unauthorized source that exceeds a threshold value related to transmission of the audio-marked packets.

16. The computer-readable storage device of claim 13, wherein stopping the subsequent unauthorized transmission comprises re-marking audio-marked packets from the unauthorized source as data packets.

17. The computer-readable storage device of claim 13, wherein stopping the subsequent unauthorized transmission comprises restricting transmission bandwidth for the unauthorized source.

* * * * *

UNITED STATES PATENT AND TRADEMARK OFFICE
CERTIFICATE OF CORRECTION

| | | |
|---|---|---|
| PATENT NO. | : 8,761,179 B2 | Page 1 of 1 |
| APPLICATION NO. | : 13/668412 | |
| DATED | : June 24, 2014 | |
| INVENTOR(S) | : Jean Meloche | |

It is certified that error appears in the above-identified patent and that said Letters Patent is hereby corrected as shown below:

Title Page Item (60) line 2 after "No." change "61/312,497" to read --61/312,498--.

Signed and Sealed this
Eighth Day of September, 2015

Michelle K. Lee
*Director of the United States Patent and Trademark Office*